US007094385B2

(12) United States Patent
Beguin et al.

(10) Patent No.: US 7,094,385 B2
(45) Date of Patent: Aug. 22, 2006

(54) PROCESS FOR THE MASS PRODUCTION OF MULTIWALLED CARBON NANOTUBES

(75) Inventors: François Beguin, Orleans (FR); Sandrine Delpeux, Chateauneuf/Loire (FR); Katarzyna Szostak, Poznan (PL)

(73) Assignee: CNRS, Paris (FR)

( * ) Notice: Subject to any disclaimer, the term of this patent is extended or adjusted under 35 U.S.C. 154(b) by 382 days.

(21) Appl. No.: 10/095,121

(22) Filed: Mar. 12, 2002

(65) Prior Publication Data

US 2004/0022719 A1 Feb. 5, 2004

(51) Int. Cl.
*D01F 9/12* (2006.01)

(52) U.S. Cl. ................................ 423/447.3; 423/447.1; 423/445 R; 977/DIG. 1

(58) Field of Classification Search ............. 423/445 R, 423/447.1, 447.2, 447.3; 977/DIG. 1
See application file for complete search history.

(56) References Cited

U.S. PATENT DOCUMENTS

2002/0025374 A1 * 2/2002 Lee et al. ................... 427/230
2003/0031620 A1 * 2/2003 Harutyunyan et al. ...... 423/461
2003/0129122 A1 * 7/2003 Chen et al. .............. 423/447.3

FOREIGN PATENT DOCUMENTS

JP 11-256430 * 9/1999
JP 2001-222150 * 8/2001

OTHER PUBLICATIONS

Endo et al. "Pyrolytic Carbon Nanotubes From Vapor–Grown Fibers", 1995, Carbon, vol. 33, No. 7, pp. 873–881.*

Flahaut et al. "Synthesis of single–walled carbon nanotubes using binary alloy nanoparticles prepared in situ by the reduction o oxide solid solutions" Jan. 29, 1999, Chemical Physics Letters 300, pp. 236–242.*

Satishkumar et al. "Single–walled nanotubes by the pyrolysis of acetylene–organomettalic mixtures" Aug. 21, 1998, Chemical Physiscs Letters 293, pp. 47–52.*

Sen et al. "Metal–filled and hollow carbon nanotubes obtained by the decomposition of metal–containing free precursor molecules" 1997, Chemistry of Materials, vol. 9, pp. 2078–2081.*

Basca et al., High specific surface area carbon nanotubes from catalytic chemical vapor deposition process, Jun. 23, 2000, Chemical Physics Letters, vol. 323, pp. 566–571.*

Flahaut et al., Synthesis of single–walled carbon nanotube–Co–MgO composite powders and extraction of the nanotubes, 2000, Journal of Materials Chemistry, vol. 10, pp. 249–252.*

Zhong et al., Catalytic growth of carbon nanoballs with and without cobalt encapsulation, Nov. 3, 2000, Chemical Physics Letters, vol. 330, pp. 41–47.*

Y. Soneda. S. et al; "High Yield of Multiwalled Carbon Nanotubes From the Decomposition of Acetylene on Co/MgO Catalyst", CRMD CNRS–Universite, Jul. 14, 2001.

* cited by examiner

*Primary Examiner*—Stanley S. Silverman
*Assistant Examiner*—Peter J Lish
(74) *Attorney, Agent, or Firm*—Nixon & Vanderhye P.C.

(57) ABSTRACT

The present invention concerns a process for the mass production of carbon nanotubes and particularly a process for selectively producing multiwalled carbon nanotubes.

22 Claims, No Drawings

PROCESS FOR THE MASS PRODUCTION OF MULTIWALLED CARBON NANOTUBES

DESCRIPTION

The present invention concerns a process for the mass production of carbon nanotubes and particularly a process for selectively producing multiwalled carbon nanotubes The use of multiwalled carbon nanotubes is considered for a number of promising applications (reinforcement of composites, storage of energy) which will require low cost and scaleable production. They have mechanical properties of great interest. The average Young modulus of 1.8 TPa is indeed higher than the one of the available carbon fibers, whatever be the tube diameter Thus, carbon nanotubes are useful for the manufacture of composites or composite matrices They are also expected to have a high capacity for the hydrogen storage.

The main known routes for the synthesis of carbon nanotubes are based on an arc-discharge process, laser ablation process, solar ablation process, chemical vapor deposition (CVD) process and catalytic decomposition process.

Arc-discharge process consists in the production of an electric arc between two graphite electrodes under nitrogen or argon. The carbon constituting the anode sublimates due to the high temperature and settles at the cathode as multiwalled carbon nanotubes obtained as a subproduct in the synthesis of the fullerenes. When the anode contains metallic catalysts, single walled carbon nanotubes are obtained.

The laser ablation process consists in the vaporization of a target of pure carbon or carbon with added alloy of transition metals (Co, Ni, Co—Ni, Co—Pt) with a pulsed laser beam at high temperature (about 1473 K). Single or multiwalled carbon nanotubes are obtained.

The same process is used with the solar ablation process.

Nevertheless, said processes are not able to be achieved in an industrial scale and are not selective enough to get products of satisfactory quality. The resulting products contain indeed such an amount of various carbon subproducts that no purification process is sufficiently efficient to remove them.

The catalytic decomposition process is the most adapted to get large amount of material. Mostly, this process consists in the decomposition of hydrocarbons or other reactive gas on the surface of supported catalysts. The main sources of carbon are methane, ethylene, acetylene, carbon monoxide, often with hydrogen and diluted in inert gases The working temperature, depending on the chosen gas, is comprised between 600° C. and 1100° C. The most used metals are Co, Fe, Ni, Mo, alone or in alloys and the main supports are $SiO_2$, $Al_2O_3$, $Fe_2O_3$ or zeolithes.

This process gives large amount of carbon nanotubes, but with impurities which are difficult to remove.

Multiwalled carbon nanotubes are obtainable by such processes by decomposing acetylene on Co based catalysts supported on zeolithes or silica. Nevertheless, those supports have high specific surface which promote the formation of disordered carbon in the opened porosity of the support and are thus not selective enough They are not easy to eliminate and require the use of concentrated hydrofluoric acid (73% w/w). Other carbon based phases are formed such as carbon shells which cause a poisoning of the catalyst. Thus, only a 20% conversion rate referred to the mass of catalyst can be obtained. Purification processes are tedious and require strong oxidant which can damage the surface of the carbon nanotubes.

Recently, solid solutions have been proposed for getting metals (M=Fe, Co, Ni) supported on $Al_2O_3$, $MgAl_2O_4$ or MgO, giving rise to a production of carbon nanotubes through the catalytic decomposition of methane or CO disproportionation. The process is not selective and especially produces carbon shells embedding the catalyst making the purification impossible. On the other hand, CO is very difficult to manipulate due to its toxicity and methane requires high temperature of about 1000° C. Other carbon nanostructures, such as nanoballs, are also formed when methane was decomposed on a CoMgO pre-reduced catalyst.

All the described processes give only a poor conversion to nanotubes, often less than 60%, and thus require purification steps due to the simultaneous production of high amounts of carbon impurities which are almost impossible to eliminate. Also, these processes need more than one step.

The inventors have found, which is the object of the present application, a new process for the selective mass production of multiwalled carbon nanotubes permitting to avoid these drawbacks, giving high production rate of carbon nanotubes, which has a high efficiency. Said process makes the purification easy and is therefore less time-consuming and less expensive.

The process according to the invention is a process for the selective mass production of multiwalled carbon nanotubes from the catalytic decomposition of hydrocarbons comprising reducing a non-previously reduced nonsupported precursor of a supported metallic catalyst under conditions enabling the in situ production of said catalyst and the production of said nanotubes.

Particularly, the process according to the invention is carried out at a temperature of 500° C. to 900° C. and said hydrocarbon is diluted in a carrier gas.

Said temperatures are generally less than those typically used, thus the process according to the invention is less expensive.

More particularly, the process according to the invention further comprises, a step of separation of said nanotubes from said catalyst.

Preferably, the process according to the invention implements the decomposition of acetylene on a CoO based precursor of catalyst.

Acetylene is one of the less expensive source of carbon and is easy to use. Moreover, this gas permits low temperatures to be used, due to its low decomposition temperature, for example at 773 K.

Preferably, the process according to the invention comprises a catalytic step consisting in the production of nascent hydrogen in situ by the acetylene decomposition so as to progressively reduce CoO to nanometric supported Co aggregates More particularly, the process according to the invention comprises the use of a CoO-based-on precursor of catalyst which is a $Co_xMg_{(1-x)}O$ solid solution.

This solid solution is a preferred precursor of catalyst which does not require pre-reduction or addition of hydrogen in the gaseous phase.

According to a preferred embodiment of the invention, the decomposition occurs at a temperature of about 600° C. and acetylene is diluted in nitrogen as carrier gas. This low temperature compared to those used in the prior art, prevents the coalescence of the cobalt particles which are generated by the acetylene decomposition.

More particularly, the separation of the multiwalled carbon nanotubes from the catalytic substrate, in the process according to the invention, comprises the steps of dissolving the catalytic substrate in an acid solution under gentle temperature, filtrating, then washing the nanotubes up to neutral pH, and drying the washed nanotubes.

Advantageously, hydrochloric acid 12 N is used, the working temperature being of about 80° C., the acidic treatment being about 12 hours long, and the drying occurring under about 120° C.

The process according to the invention may further comprise a thermal treatment step. Said step can be useful for removing the remaining metallic catalytic substrate which is present at a very small amount (less than 100 ppm) and also for curing the defects which appear on the aromatic layers The carbon layers become more continuous and straighter.

Particularly, the thermal treatment consists in the placement of the resulting multiwalled carbon nanotubes under a neutral atmosphere at a temperature comprised between 2200° C. and 2800° C. for a few hours.

According to an embodiment of the process of the invention, the catalytic step is carried out in a fluidized bed. Such an embodiment is advantageously carried out with a catalyst which does not aggregate or which is under a powdered form.

For a better understanding, the following is a detailed description of a preferred implementation of the process according to the invention which was developed. X-ray diffractogram of a calcined precursor of a catalyst for an implementation of the process according to the invention was recorded. Moreover, a scanning electron microscopy image of the multiwalled carbon nanotubes obtained by an implementation of the process according to the invention was prepared along with a TEM image of the same carbon nanotubes and a 002 lattice fringe image of a multiwalled carbon nanotube obtained by an implementation of the process according to the invention. A curve of the nitrogen adsorption at 77 K on multiwalled carbon nanotubes obtained by an implementation of the process according to the invention was also recorded.

A solid solution precursor is prepared by mixing thoroughly magnesium nitrate hexahydrate (10 mmol), cobalt nitrate hexahydrate (6 mmol) and citric acid (10 mmol) in a minimum amount of water. After gentle evaporation of water, the obtained viscous gel is dried at 150° C. and then calcined under a nitrogen flow at 700° C. during five hours, to give the $Co_xMg_{(1-x)}O$ solid solution. The X-ray diffractogram of the calcined precursor presents only one series of lines typical of a solid solution of the two oxides with the respective proportions: $Co_{0.4}Mg_{0.6}O$. The solid solution is then crushed in a thin and homogenous phase. A calcination under air instead of nitrogen would give $Co_3O_4$ which is less selective.

A thin layer of the above prepared catalyst on a porcelain plate is introduced in a quartz tube reactor and the temperature is stabilized at 600° C. under a nitrogen flow (350 ml/min) Then acetylene is introduced at a flow rate of 100 ml/min during one hour together with nitrogen, leading to the production of a multiwalled carbon nanotube deposit. The decomposition of the acetylene is conducted under nitrogen flow without previous reducing step The reactions which then occur are

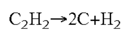

$$C_2H_2 \rightarrow 2C + H_2$$

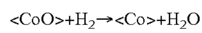

$$\langle CoO\rangle + H_2 \rightarrow \langle Co\rangle + H_2O$$

where <Co> represents the Co particles supported on the oxide.

After cooling down, the catalytic substrate is dissolved by hydrochloric acid (12 mol.$l^{-1}$) treatment at 80° C. during twelve hours, and after filtrating the solution, the carbon nanotubes are repeatedly washed with de-ionised water until neutral pH filtrate and dried at 120° C. This step permits to make the formed metallic cobalt soluble.

The quality of the carbon nanotubes production has been first estimated by scanning electron microscopy (SEM). The obtained material appears as a very dense network of entangled multiwalled carbon nanotubes.

As seen from the TEM images, the multiwalled carbon nanotubes according to the invention are thinner but longer than those produced over Co/silica or Co/zeolithe, the external diameter ranges from 7 to 20 nm and the length up to 25–50 μm. The central canal is quite well defined (about 5 nm in diameter) and the walls consist of continuous carbon layers oriented parallel to the tube axis. Most of the carbon nanotubes according to the invention have closed tips and sometimes cobalt particles are encapsulated at the tip or inside the canal. These nanoparticles could be partly removed while opening nanotubes by an additional oxidizing treatment.

The use of the $Co_xMg_{(1-x)}O$ solid solution offers numerous advantages over the supported catalysts. MgO, is easily dissolved by HCl, whereas silica or zeolite need to be eliminated by concentrated hydrofluoric acid (73% w/w). Elemental analysis after HCl treatment detected carbon (at least 96%), hydrogen (less than 0.3 wt %), cobalt (less than 2 wt. %), oxygen (less than 0.8%) and less than hundred ppm of magnesium. Carbon by-products such as acetylene black or disordered carbon are not observed in TEM that shows a remarkable selectivity of the process for the formation of multiwalled carbon nanotubes. Therefore an additional oxidizing acid treatment which often partly damages the carbon nanotubes and is responsible for some lost of material is not required.

Starting from 2 g of catalyst precursor, 6 g of purified multiwalled carbon nanotubes are collected, that shows a high efficiency of the $Co_xMg_{(1-x)}O$ catalytic precursor For a comparison, in the case of Co (2.5 wt %) supported on zeolithe, 2 g catalyst yield only 600 mg of carbon material, consisting of multiwalled carbon nanotubes associated to disorganized carbon nanoparticles trapped in the inner pores of the support.

Nascent hydrogen in situ produced by acetylene decomposition progressively reduces CoO to nanometric cobalt aggregates supported on MgO. This allows a high multiwalled carbon nanotube yield at very low temperature (i e 600° C.), without the formation of carbon by-products which generally poison the catalyst. Another advantage is a limited coalescence of the catalyst clusters that probably explains the small tube diameters and narrow distribution.

As for most of the pristine multiwalled carbon nanotubes, a type IV nitrogen adsorption isotherm is observed on the nanotubular material at 77K typical of an open mesoporous network of entangled multiwalled carbon nanotubes A BET specific surface area value of 220 $m^2/g$ is calculated from the adsorption data. Multiwalled carbon nanotubes produced using cobalt supported either on silica or on NaY zeolithe gave higher (430 $m^2/g$) and lower (126 $m^2/g$) values, respectively Carbon nanotubes produced both from Co/NaY and $Co_xMg_{(1-x)}O$ solid solution have closed tips. However, in the case of the $Co_xMg_{(1-x)}O$ substrate, they have a less regular surface and they look more tightly entangled, that could explain higher values of mesopore volume and BET surface area. Using Co supported on silica gives quite different multiwalled carbon nanotubes with open tips and pyrolytic carbon coating.

For the first time, multiwalled carbon nanotubes could be produced selectively at high yield, for example from the decomposition of acetylene at low temperature on a $Co_xMg_{(1-x)}O$ solid solution. In situ formation of cobalt nanoparticles supported on MgO at low temperature as synthesis proceeds is undoubtedly the reason for such good performance of the catalyst. Due to the absence of other carbon forms, only a very simple treatment in non-oxidizing medium is required for getting a good purity of the material. Since the catalyst is not sticky but rather a black fluffy powder, a continuous process in a fluidized bed reactor can be easily developed to get quasi-industrial amounts of multiwalled carbon nanotubes. Said new method makes it possible to use multiwalled carbon nanotubes in various fields.

The most explored applications are reinforcement of composites and storage of energy and gas.

What is claimed is:

1. A process for the selective mass production of multiwalled carbon nanotubes from the decomposition of hydrocarbons on a catalyst precursor, said process comprising:

a) providing a non-reduced and non-supported precursor of a metallic catalyst, mixed with a non-reactive compound, b) treating the mixture with a gas flow, wherein said hydrocarbons are the only reactive gases present in the gas flow, under conditions which enable the production of nascent hydrogen from the decomposition of said hydrocarbon and the reduction of the catalyst precursor into the catalyst in situ with the production of said nanotubes, the catalyst becoming then supported by the non-reactive compound, and c) recovering said nanotubes.

2. The process according to claim 1, wherein said decomposition occurs at a temperature of 500° C. to 900° C. and in that said hydrocarbon is diluted in a carrier gas.

3. The process according to claim 1, wherein said hydrocarbon is acetylene and said precursor is a CoO based precursor of catalyst.

4. The process according to claim 3, wherein said catalytic step consists in the production of nascent hydrogen in situ by the acetylene decomposition so as to progressively reduce CoO to nanometric supported Co aggregates.

5. The process according to claim 3 wherein CoO based precursor of catalyst is a $Co_xMg_{(1-x)}O$ solid solution.

6. The process according to claim 5, wherein the processing temperature is about 600° C. and in that said carrier gas is nitrogen.

7. The process according to claim 5, wherein the separation of said nanotubes from said catalyic substratet comprising the steps of dissolving the catalytic substrate in an acidic solution under gentle temperature, recovering the nanotubes, washing said nanotubes until neutral pH and drying the washed nanotubes.

8. The process according to claim 7, wherein said acidic solution is 12 N hydrochloric acid, in that the working temperature is about 80° C., in that the acidic treatment is about 12 hours long, and in that the drying occurs under 120° C.

9. The process according to claim 1, further comprising a thermal treatment.

10. The process according to claim 9, wherein the thermal treatment consists in placing the resulting nanotubes under a neutral atmosphere at a temperature between 2200° C. and 2800° C., for a few hours.

11. The process according to claim 1, wherein the catalytic step is carried out in a fluidized bed.

12. A process for the selective mass production of multiwalled carbon nanotubes from the decomposition of hydrocarbons on a catalyst precursor, said process comprising:

a) providing a non-reduced precursor of a metallic catalyst, contained in a solid solution with a refractory compound, b) treating the mixture with a gas flow, wherein said hydrocarbons are the only reactive gases present in the gas flow, under conditions which enable the production of nascent hydrogen from the decomposition of said hydrocarbons and the reduction of the catalyst precursor into the catalyst in situ with the production of said nanotubes, the catalyst becoming supported by the refractory compound, and c) recovering said nanotubes.

13. The process according to claim 12, wherein said decomposition occurs at a temperature of 500° C. to 900° C. and in that said hydrocarbon is diluted in a carrier gas.

14. The process according to claim 12, wherein said hydrocarbon is acetylene and said precursor is a CoO based precursor of catalyst.

15. The process according to claim 14, wherein said catalytic step consists in the production of nascent hydrogen in situ by the acetylene decomposition so as to progressively reduce CoO to nanometric supported Co aggregates.

16. The process according to claim 14 wherein CoO based precursor of catalyst is a $Co_xMg_{(1-x)}O$ solid solution.

17. The process according to claim 16, wherein the processing temperature is about 600° C. and in that said carrier gas is nitrogen.

18. The process according to claim 16, wherein the separation of said nanotubes from said catalyic substratet comprising the steps of dissolving the catalytic substrate in an acidic solution under gentle temperature, recovering the nanotubes, washing said nanotubes until neutral pH and drying the washed nanotubes.

19. The process according to claim 18, wherein said acidic solution is 12 N hydrochloric acid, in that the working temperature is about 80° C., in that the acidic treatment is about 12 hours long, and in that the drying occurs under 120° C.

20. The process according to claim 12, further comprising a thermal treatment.

21. The process according to claim 20, wherein the thermal treatment consists in placing the resulting nanotubes under a neutral atmosphere at a temperature between 2200° C. and 2800° C., for a few hours.

22. The process according to claim 12, wherein the catalytic step is carried out in a fluidized bed.

* * * * *